United States Patent
Ikarashi

(10) Patent No.: US 9,109,927 B2
(45) Date of Patent: Aug. 18, 2015

(54) POINTER-TYPE METER

(75) Inventor: Hideki Ikarashi, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 919 days.

(21) Appl. No.: 13/148,450

(22) PCT Filed: Feb. 17, 2010

(86) PCT No.: PCT/JP2010/052307

§ 371 (c)(1),
(2), (4) Date: Aug. 8, 2011

(87) PCT Pub. No.: WO2010/098238

PCT Pub. Date: Sep. 2, 2010

(65) Prior Publication Data

US 2012/0000413 A1   Jan. 5, 2012

(30) Foreign Application Priority Data

Feb. 26, 2009   (JP) .................................. 2009-044491

(51) Int. Cl.
| G01D 11/28 | (2006.01) |
| B60K 37/02 | (2006.01) |
| G01D 13/04 | (2006.01) |
| G01D 13/26 | (2006.01) |

(52) U.S. Cl.
CPC ................ *G01D 11/28* (2013.01); *B60K 37/02* (2013.01); *G01D 13/04* (2013.01); *G01D 13/265* (2013.01); *B60K 2350/1064* (2013.01)

(58) Field of Classification Search
CPC ........ B60K 37/00; B60K 37/02; G01D 11/28; G01D 13/04; G01D 13/22; G01D 13/265; G01D 13/28

USPC ............ 116/286–288, 284, DIG. 6, DIG. 36, 116/62.1, 62.4

See application file for complete search history.

(56) References Cited

U.S. PATENT DOCUMENTS

| 6,817,310 B2 * | 11/2004 | Sugiyama et al. ........... 116/62.4 |
| 2005/0109261 A1 | 5/2005 | Tanaka et al. |
| 2007/0279243 A1 | 12/2007 | Araki et al. |

FOREIGN PATENT DOCUMENTS

| JP | 5-23046 | 3/1993 |
| JP | 2005-181301 | 7/2005 |
| JP | 2005-241565 | 9/2005 |
| JP | 2006-098160 | 4/2006 |
| JP | 2006-234618 | 9/2006 |
| JP | 2008-014931 | 1/2008 |
| JP | 2008-064636 | 3/2008 |

* cited by examiner

*Primary Examiner* — Daniel S Larkin
*Assistant Examiner* — Irving A Campbell
(74) *Attorney, Agent, or Firm* — McDermott Will & Emery LLP

(57) ABSTRACT

A pointer-type meter is provided in which, even when a pointer has a meandering shape, the influence thereof on the operation characteristics of the pointer can be minimized. The meter includes a display 1, display plates 21 and 22 having indicator portions 211 and 221, respectively, and placed to allow visual recognition of the display 1, a driving apparatus 6 placed at the back of the display 1 and having a pointer shaft 61 protruding toward the display 1, and a pointer 7 pivoting about the pointer shaft 61 serving as a rotation center axis RC to point to the indicator portions 211 and 221, the pointer 7 including a detour portion 71 and a pointing portion 72 pointing to the indicator portions 211 and 221, wherein a point P1 of the detour portion 71 farthest from the rotation center axis RC is closer to the rotation center axis RC than a tip P2 of the pointing portion 72.

4 Claims, 2 Drawing Sheets

POINTER-TYPE METER

RELATED APPLICATIONS

This application is the U.S. National Phase under 35 U.S.C. §371 of International Application No. PCT/JP2010/052307, filed on Feb. 17, 2010, which in turn claims the benefit of Japanese Application No. 2009-044491, filed on Feb. 26, 2009, the disclosures of which Applications are incorporated by reference herein.

TECHNICAL FIELD

The present invention relates to a pointer-type meter mounted, for example on automobiles, motorcycles, building machines, and small ships, and more particularly, to a pointer-type meter for performing pointer-type display by using an indicator portion in a dial and a pointer pointing to the indicator portion on the outer periphery of a display with a liquid crystal and the like.

BACKGROUND ART

A known pointer-type meter of this type is described, for example, in Patent Document 1 described below. The pointer-type meter includes a display formed of a liquid crystal display, a display plate having an indicator portion such as scales and characters, surrounding the periphery of the display, and having a window portion formed therein through which the display is visually recognized, a driving apparatus placed at the back of the display and having a pointer shaft protruding toward the display, and a pointer coupled to the pointer shaft, extending to bend in a generally S shape so as to detour around the display and the display plate, driven by the driving apparatus to pivot about the pointer shaft serving as the rotation center to point to the indicator portion.

The pointer includes a first pointer portion extending in the direction opposite to the rotation center on the back-face side of the display, a second pointer portion connected to the first pointer portion and extending in a thickness direction of the display on the side of the display, a third pointer portion connected to the second pointer portion and extending in the rotation center direction between the display and the display plate on the front side of the display, and a fourth pointer connected to the third pointer portion and extending in the thickness direction of the display plate on the inner periphery of the window portion of the display plate, and a fifth pointer portion connected to the fourth pointer portion and extending in the direction opposite to the rotation center on the front side of the display plate to point to the indicator portion. Since the pointer bent in the generally S shape is formed to extend between the display and the display plate and over the inner periphery of the window portion of the display plate to reach the front side of the display plate in this manner, slits can be eliminated in the display plate to improve the appearance quality.

PRIOR ART REFERENCE

Patent Document

[Patent Document 1] JP-A-2005-181301

SUMMARY OF THE INVENTION

Problems that the Invention is to Solve

In the pointer-type meter described in Patent Document 1, however, it is necessary to meander the pointer a plurality of times in conformity to the display and the display plate so as to cause the pointer to detour around the display and the display plate and to reach the front of the display plate. Thus, the pointer is inevitably increased in size and weight to present the problem in which the responsivity and the start characteristics of the pointer are easily reduced.

The present invention has been made in view of the above-mentioned problem, and it is an object thereof to provide a pointer-type meter in which, even when a pointer has a meandering shape, the influence thereof on the operation characteristics of the pointer can be minimized.

Means for Solving the Problems

To solve the abovementioned problem, the present invention provides a pointer-type meter including a display, a display plate having an indicator portion, surrounding the periphery of the display, and placed to allow visual recognition of the display, a driving apparatus placed at the back of the display and having a pointer shaft protruding toward the display, and a pointer coupled to the pointer shaft and pivoting about the pointer shaft serving as a rotation center to point to the indicator portion, the pointer including a detour portion extending on a back-face side of the display and bent in a direction of the rotation center and a pointing portion extending in a direction opposite to the rotation center on a front side of the display plate to point to the indicator portion, characterized in that a point of the detour portion farthest from the rotation center is closer to the rotation center than a tip of the pointing portion. Since such a configuration can prevent the detour portion from protruding toward the side, a smaller size and a reduction in moment of inertia can be achieved. Even when the pointer has the meandering shape, the influence thereof on the operation characteristics of the pointer can be minimized.

The present invention is characterized in that the display plate has a first display plate and a second display plate placed closer to an observer than the first display plate, and a point of the detour portion extending in the direction of the rotation center extends between the first display plate and the second display plate toward the rotation center and connects to the pointing portion. With such a configuration, the path from the detour portion to the pointing portion can be shortened to reduce the size, so that the smaller size and the reduction in moment of inertia can be further achieved.

The present invention is characterized in that the display plate has a first cone portion increased in diameter from a first deep portion toward an observer and a second cone portion increased in diameter from a second deep portion closer to the first cone portion toward the observer, and a point of the detour portion extending in the direction of the rotation center extends between the first cone portion and the second cone portion toward the rotation center and connects to the pointing portion. With such a configuration, the path from the detour portion to the pointing portion can be shortened to reduce the size, so that the smaller size and the reduction in moment of inertia can be further achieved.

The present invention is characterized in that the display plate has a cone portion increased in diameter from a deep portion toward an observer, and a point of the detour portion extending in the direction of the rotation center passes through an approximately intermediate portion of the cone portion toward the rotation center and connects to the pointing portion. With such a configuration, the path from the detour portion to the pointing portion can be shortened to reduce the size, so that the smaller size and the reduction in moment of inertia can be further achieved.

The present invention is characterized by providing an edge member surrounding a display area of the display along the window portion. With such a configuration, the display area of the display can be separated from the display plate. The observer can move the line of sight to the intended information in a short time to improve the visibility.

Advantage of the Invention

According to the present invention, the intended object can be achieved to provide the pointer-type meter in which, even when the pointer has the meandering shape, the influence thereof on the operation characteristics of the pointer can be minimized.

MODE FOR CARRYING OUT THE INVENTION

Preferred embodiments of the present invention will hereinafter be describe with the accompanying drawings.

Figure 1:
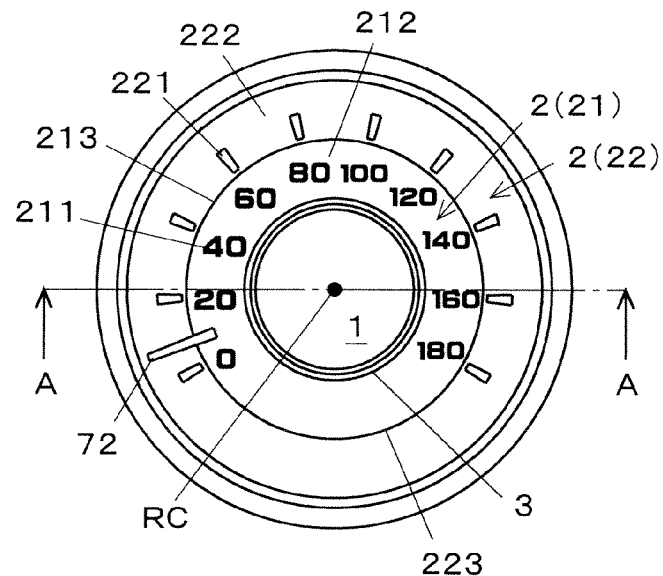
FIG. 1 is a front view of a pointer-type meter according to a first embodiment of the present invention.
Figure 2:
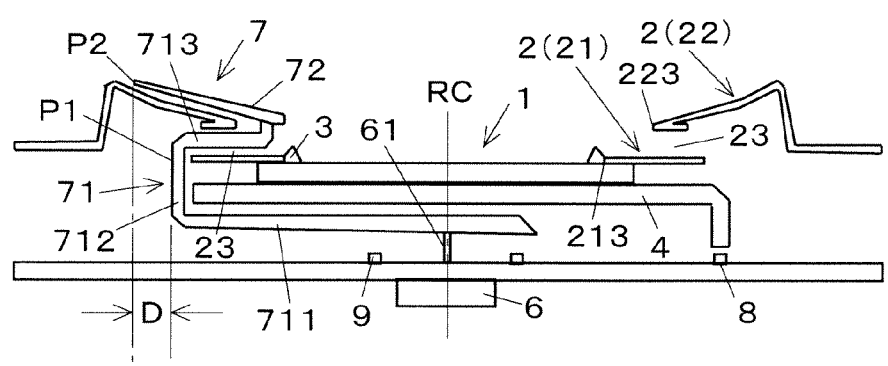
FIG. 2 is a section view taken along A-A in FIG. 1.

In FIG. 1 and FIG. 2, a pointer-type meter according to a first embodiment of the present invention is incorporated, for example in a combination meter mounted on a dashboard of an automobile, and includes a display 1, a display plate 2, an edge member 3, a light guide 4, a circuit substrate 5, a driving apparatus 6, a pointer 7, and light sources 8 and 9. Hatching is omitted in FIG. 2.

The display 1 is formed of a liquid crystal panel, for example, has a circular outer shape conforming to the shape of a first window portion, later described, of the display plate 2, and is electrically driven through the circuit substrate 5 to show arbitrary vehicle information including the running distance, outer temperature, and fuel efficiency.

The display plate 2 is formed in two separate sections of a first display plate 21 placed closer to the display 1 and a second display plate 22 placed closer to an observer than the first display plate 21. The display plates 21 and 22 are provided, for example, by printing an indicator portion and a background portion serving as the background of the indicator portion, later described, with a well-known screen printing or digital printing technique on the surface of a light-transmitting substrate. While the display plate 2 is divided into the two separate sections of the first and second display plates 21 and 22 in the present embodiment, the display plate 2 may be formed as one display plate or may be divided into two or more plates.

The first display plate 21 is formed, for example as a circular flat plate. On the first display plate 21, the abovementioned printing technique is used to form a first indicator portion 211 (white color in the present embodiment) consisting of numbers (characters) having a light-transmitting property and a first background portion 212 (black color in the present embodiment) having a light-shield property, for example.

The first display plate 21 is placed on the front side of the display 1 (the side facing the observer, not shown) so as to surround and cover the outer end portion of the display and the peripheral region of the display 1 in which information display is not performed, and has the first window portion 213 formed therein to allow the visual recognition of an information display area of the display 1. While the first window portion 213 is formed as a circular opening portion which exposes the information display area of the display 1, the first window portion 213 may be formed as a transparent transmitting portion covering the information display area of the display 1.

The second display plate 22 has a cone portion 220 gradually increased in diameter (its diameter is increased) in a trumpet-bell shape from a deep portion closer to the first display plate 21 toward the observer and larger than the first display plate 21 and its outer peripheral portion. On the second display plate 22, the abovementioned printing technique is used to form a second indicator portion 221 (the same color as the first indicator portion 211 in the present embodiment) consisting of scales having a light-transmitting property and a second background portion 222 (the same color as the first background portion 212 in the present embodiment) having a light-shield property, for example. In addition, a three-dimensional portion such as the cone portion 220 is formed by using a well-known drawing technique.

The second display plate 22 is placed on the front side of the first display plate 21 so as to surround and cover the outer end portion and the peripheral portion of the first display plate 21, and has a second window portion 223 of circular shape formed therein to allow the visual recognition of the first indicator portion 21 of the first display plate 21.

The first and second display plates 21 and 22 are placed one on another in the direction of the line of sight of the observer through a space portion 23 such that the first and second window portions 213 and 223 have the concentric relationship with respect to a rotation center, later described, and a portion part of a detour portion of the pointer 7, later described, is located in the space portion 23.

The edge member 3 is formed of a decoration member provided by performing metal-like (silver) plating or painting on the surface of a synthetic resin member, for example having a generally triangular shape in section and a circular shape when viewed from the front. The edge member 3 is placed on the front side of the display 1 so as to extend along the inner edge of the first window portion 213 to rim the display area of display 1. Alternatively, the edge member 3 may be provided as a light-transmitting member which emits light in a predetermined color in response to light from a light source, not shown, or from the light sources 8 and 9.

The light guide 4 is formed, for example of a light-transmitting synthetic resin, is placed on the back faces of the display 1 and the first display plate 21 (the face toward the side opposite to the observer), and receives the light of the light source 8 to illuminate, with backlight, the display 1 and the first and second display plates 21 and 22 (the first and second indicator portion 211 and 221) from the back side (the side opposite to the observer).

The circuit substrate 5 is formed of a well-known hard circuit substrate, is placed on the back side of the light guide 4, and has the driving apparatus 6 and the light sources 8 and 9 mounted thereon.

The driving apparatus 6 is formed, for example of a stepping motor, is placed at the back of the display 1 and the light guide 4, has a pointer shaft 61 protruding toward the display 1. In this case, the driving apparatus 6 has its body portion placed on the back-face side of the circuit substrate 5, and the pointer shaft 61 is configured to pass through the circuit substrate 5 to protrude toward the display 1. The pointer shaft 61 extends toward the front side so that it rotates to form the rotation center axis (the virtual shaft serving as the rotation center) RC in this case.

The pointer 7 is formed, for example of a light-transmitting synthetic resin and includes a detour portion 71 passing from the back-face side of the display 1 through the side-face side and bent in the direction of the rotation center RC on the front side of the display 1 (the side of the observer), a pointing portion 72 extending in the direction opposite to the rotation center RC (the opposite direction to the rotation center RC) on the front side of the second display plate 22 and pointing to the first and second indicator portions 211 and 221, and a connecting portion 73 connecting the detour portion 71 to the pointing portion 72.

The detour portion 71 is formed in a generally U shape by a first pointer portion 711 extending along the display 1 and across the rotation center axis RC outward along the rotation plane on the back-face side of the display 1 and coupled to the pointer shaft 61, a second pointer portion 712 bent from the end portion of the first pointer portion 711 at a predetermined angle (generally 90 degrees in this case) and extending toward the front on the side-face side of the display 1 (in parallel with the rotation center axis RC), and a third pointer portion 713 bent from the end portion of the second pointer portion 712 at a predetermined angle (generally 90 degrees in this case) and extending toward the rotation center axis RC within the space portion 23 defined between the front-face sides of the display 1 and the first display plate 21 and the back-face side of the second display plate 22. Each of the corner portions (bend portions) of the first to third pointer portions 711 to 713 has a reflecting face formed thereon which reflects the light entering therein from the light source 9 toward the direction of the tip (the pointing portion 72).

The pointing portion 72 is formed of a light-transmitting synthetic resin different from the detour portion 71, is coupled to the detour portion 71 through the connecting portion 73, and linearly extends in the direction opposite to the rotation center axis RC along the front face of the second display plate 22. When the pointer shaft 61 rotates in association with the activation of the driving apparatus 6, the pointing portion 72 pivots on the second display plate 22 to point to the first and second indicator portions 211 and 221.

A back end portion of the pointing portion 72 on the side opposite to the tip portion (closer to the rotation center axis RC) extends beyond the connecting portion 73 toward the rotation center axis RC. The width of the portion of the pointing portion 72 associated with the connecting portion 73 is formed to be larger than the width of the connecting portion 73. Thus, when the observer views that portion from the front, the connecting portion 73 is hidden by the pointing portion 72 and is hard to see, so that the pointing portion 72 is visually recognized as if it floated.

The connecting portion 73 extends along the rotation center axis RC and connects the detour portion 71 to the pointing portion 72.

In the pointer 7 configured in this manner, the light of the light source 9 is guided to the pointing portion 72 through the detour portion 71, so that the pointing portion 72 is caused to emit light.

With attention given to the position relationship between the detour portion 71 and the pointing portion 72, a point P1 of the detour portion 71 farthest from the rotation center axis RC is provided at a position closer to the rotation center axis RC than a tip P2 of the pointing portion 71 by a predetermined distance D.

Each of the light sources 8 and 9 is formed, for example of a light-emitting diode illuminating each of the display plates 21 and 22 and the pointer 7, and is mounted on the circuit substrate 5.

As described above, in the present embodiment, the pointer-type meter includes the display 1, the display plates and 22 having the indicator portions 211 and 221, respectively, surrounding the periphery of the display 1, and placed to allow visual recognition of the display 1, the driving apparatus 6 placed at the back of the display 1 and having the pointer shaft 61 protruding toward the display 1, and the pointer 7 coupled to the pointer shaft 61 and pivoting about the pointer shaft 61 serving as the rotation center axis RC to point to the indicator portions 211 and 221, the pointer 7 including the detour portion 71 extending from the back-face side to the side-face side of the display 1 and bent in the direction of the rotation center axis RC on the front side of the display 1 and the pointing portion 72 extending in the direction opposite to the rotation center axis RC on the front side of the display plates 21 and 22 to point to the indicator portions 211 and 221, wherein the point P1 of the detour portion 71 farthest from the rotation center axis RC is closer to the rotation center axis RC than the tip P2 of the pointing portion 72. Since this can prevent the detour portion 71 from protruding toward the side, the smaller size and the reduction in moment of inertia can be achieved. Even when the pointer 7 has the meandering shape, the influence thereof on the operation characteristics can be reduced to the minimum.

In the present embodiment, the display plates 21 and 22 have the first display plate 21 placed closer to the display 1 and the second display plate 22 placed closer to the observer than the first display plate 21, and the third pointer portion 713 serving as the point of the detour portion 71 extending in the direction of the rotation center axis RC on the front side of the display 1 extends in the space portion 23 formed between the first display plate 21 and the second display plate 22 toward the rotation center axis RC and connects to the pointing portion 72. Thus, the path from the detour portion 71 to the pointing portion 72 can be shortened to reduce the size, so that the smaller size and the reduction in moment of inertia can be further achieved. Specifically, although not shown, as compared with the path of the third pointer portion 713 extending between the first display plate 21 and the display 1 toward the rotation center axis RC and connecting to the connecting portion 73 and the pointing portion 72 through the first window portion 213, the path of the third pointer portion 713 extending through the space portion 23 toward the rotation center axis RC and connecting to the connecting portion 73 and the pointing portion 72 through the second window portion 223 can shorten the path from the detour portion 71 to the pointing portion 72.

In the present embodiment, the edge member 3 surrounding the display area of the display 1 along the first window portion 213 is provided to allow the display area of the first display 1 to be separated from the display plates 21 and 22. The observer can move the line of sight to the intended information in a short time to improve the visibility.

While the second display plate 22 is formed in the cone shape in the present embodiment, it may be formed in the same flat plate shape as the first display plate 21 and may be placed in parallel with the first display plate 21.

While both of the first and second display plates 21 and 22 are provided with the first and second indicator portions 211 and 221, respectively, in the present embodiment, it is possible to form all of the indicator portions 211 and 221 in only one of the display plates 21 and 22 and to use the other of the display plates 21 and 22 as a background plate having only the background portions 212 and 222.

The indicator portions 211 and 221 may be realized by various types of marks and graphics, in addition to the characters and scales.

Figure 3:
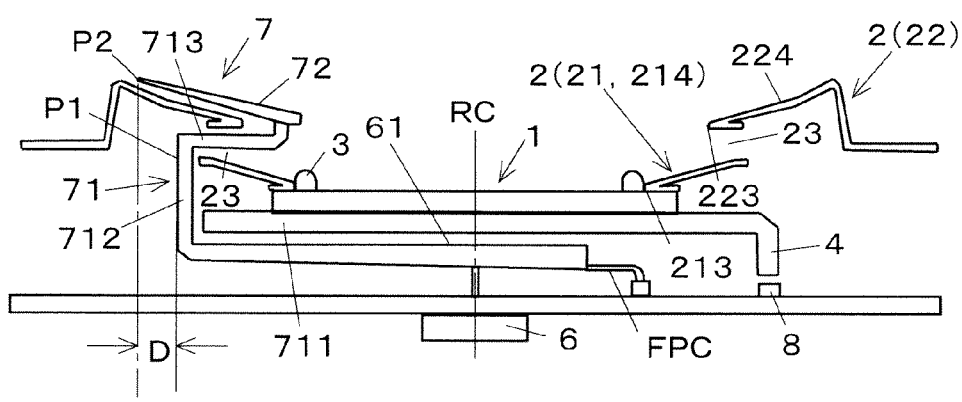
FIG. 3 is a section view of a pointer-type meter according to a second embodiment of the present invention.

Next, a second embodiment of the present invention will be described with reference to FIG. 3. In FIG. 3, hatching is omitted.

In a pointer-type meter according to the present embodiment, a display plate 2 has a first display plate 21 placed on the side of a display 1 and formed of a first cone portion 214 gradually increased in diameter in a trumpet-bell shape from a first deep portion toward the observer and a second display plate 22 placed in front of the first cone portion 214 and having a second cone portion 224 gradually increased in diameter in a trumpet shape from a second deep portion closer to the first cone portion 214 toward the observer.

A detour portion 71 of a pointer 7 is configured such that a third pointer portion 713 extends through a space portion 23 formed between the first cone portion 214 and the second cone portion 224 toward a rotation center axis RC and connects to a pointing portion 72 through a connecting portion 73.

With such a configuration, as in the first embodiment, a smaller size and a reduction in moment of inertia can be achieved, and the path from the detour portion 71 to the pointing portion 72 can be shortened to reduce the size, so that the smaller size and the reduction in moment of inertia can be further achieved.

In the present embodiment, a light source, not shown, is mounted in the pointing portion 72 in the present embodiment, and the light source is supplied with power through a flexible printed circuit FPC. In addition, the sectional shape of an edge member 3 is changed to an arc shape in the present embodiment.

Figure 4:
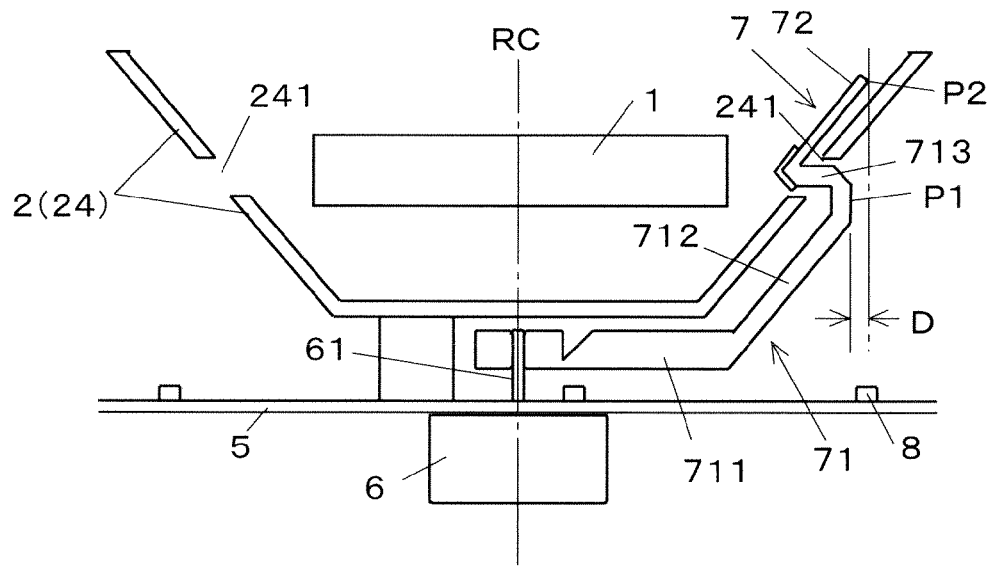
FIG. 4 is a section view of a pointer-type meter according to a third embodiment of the present invention.

Next, a third embodiment of the present invention will be described with reference to FIG. 4. Hatching is omitted in FIG. 4.

In a pointer-type meter according to the present embodiment, a display plate 2 has a cone portion 24 gradually increased in diameter from a deep portion toward the observer, a detour portion 71 of a pointer 7 extends on the back-face side and the side-face side of a display 1 with the display plate 2 interposed between them, and a third pointer portion 713 passes through a slit 241 formed in an approximately intermediate portion of the cone portion 24 toward a rotation center axis RC and connects to a pointing portion 72.

With such a configuration, as in the first embodiment, a smaller size and a reduction in moment of inertia can be achieved, and the path from the detour portion 71 to the pointing portion 72 can be shortened to reduce the size, so that the smaller size and the reduction in moment of inertial can be further achieved. While a second pointer portion 712 forming part of the detour portion 71 is bent in the present embodiment, the shape of the detour portion 71 can be arbitrarily set as long as the detour portion 71 is shaped to extend on the back-face side of the display 1 toward the rotation center axis RC.

Figure 5:
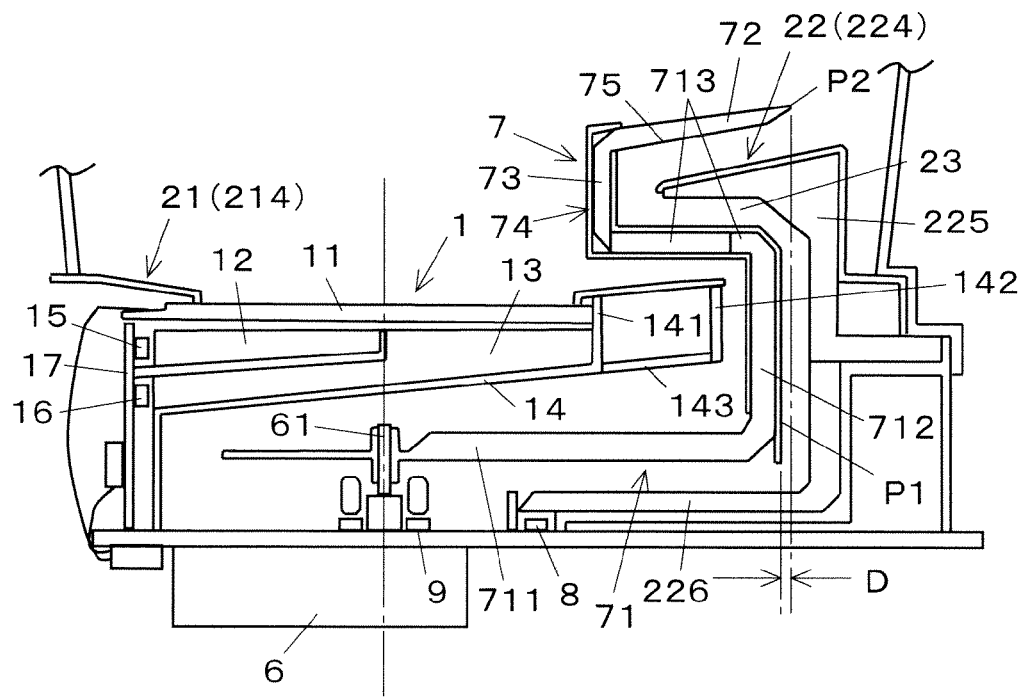
FIG. 5 is a section view of a pointer-type meter according to a fourth embodiment of the present invention.

Next, a fourth embodiment of the present invention will be described with reference to FIG. 5. Hatching is omitted in FIG. 5.

A pointer-type meter according to the present embodiment is the same as that of the second embodiment in that first and second display plates 21 and 22 have cone portions 214 and 224, respectively, but is different from that of the abovementioned embodiment in the illumination configuration of a display 1 and the first display plate 21, the detailed configuration of a pointer 7, and the second display plate 22 and its illumination configuration.

Specifically, the display 1 includes a liquid crystal panel 11 serving as a display element, a plurality of light guide plates 12 and 13 placed along the back face of the liquid crystal panel 11, a support body 14 supporting the liquid crystal panel 11 and the first display plate 21, light sources 15 and 16 illuminating the liquid crystal panel 11 through the light guide plates 12 and 13 and formed, for example of light-emitting diodes having different emission colors, and a light source substrate 17 on which the light sources 15 and 16 are mounted. The liquid crystal panel 11 is configured to change the color for each area through the plurality of light guides 12 and 13 and the plurality of light sources 15 and 16.

The support body 14 includes a first holding portion 141 holding the liquid crystal panel 11 and a second holding portion 142 holding the first display plate 21, and has an opening portion 143 at the position associated with the first display plate 21 for transmitting light from the light sources 8 and 9 toward the first display plate 21 to illuminate a first indicator portion 211. A plurality of opening portions 143 are formed along the arrangement shape of the first indicator portion 211. A line portion extending radially with respect to a rotation center axis RC is formed between the adjacent opening portions 143 along the arrangement shape of the first indicator portion 211. The single support body 14 can support both of the liquid crystal panel 11 and the first display plate 21 in this manner to define the position relationship of them accurately. In addition, since separate support bodies do not need to be provided, the cost can be reduced. Furthermore, the first display plate 21 can be illuminated through the opening portion 143 to eliminate the need of a dedicated light source or light guide, thereby reducing the cost.

In the pointer 7 formed of a light-transmitting synthetic resin, the entire peripheries or required portions of a second pointer portion 712, a third pointer portion 713, and a connecting portion 73 are covered with a tubular member 74 formed of a black-color light-shield synthetic resin, for example, so that the light escaping from the pointer 7 to the surroundings is blocked to maintain the illumination quality. Instead of the tubular member 74, a light-shield film may be provided.

In the present embodiment, a third detour portion 713 of detour portion 71 is divided into two, the third detour portion 713 and the connecting portion 73 are separate as different parts, and they are coupled through the tubular member 74. A colored layer 74 formed, for example of a hot stamp layer is formed on the front face and the back face of a pointing portion 72 to allow the visual recognition of the pointing portion 72 with the color of the colored layer 74 when the light sources 8 and 9 are lit.

In the present embodiment, the illumination color of a second indicator portion 221 of the second display plate 22 is white color, and the light emission colors of the light sources 8 and 9 are also white color. The light from the white-color light sources 8 and 9 is colored by the colored layer 74 to recognize the pointing portion 72 visually in a different color from the second indicator portion 221. The colored layer 74 is provided for the pointing portion 72, and the white color is set for the light emission colors of the light source 9 for the pointer and the light source 8 for the display plate in this manner. Thus, even when the light emission color of the pointing portion 72 is different from the light emission color of the second indicator portion 221, it is not necessary to use a light-shield wall or the like to partition the illumination space formed between the back of the display 1 and a circuit substrate 5 so as not to mix the light emission colors of the light sources 8 and 9, so that the cost can be reduced.

A light guide member 225 is placed at the back of the second display plate 22, and a different light guide member 226 is placed between the light guide member 225 and the light source 8. Light is guided through the different light guide member 226 into the light guide member 225 to cause the second indicator portion 221 provided for the second display plate 22 to emit light.

INDUSTRIAL APPLICABILITY

The present invention is applicable to a pointer-type meter mounted on any mobile body, not limited to automobiles, motorcycles, building machines, and small ships.

DESCRIPTION OF REFERENCE NUMERALS AND SIGNS 1 display
2 display plate
3 edge member
4 light guide
5 circuit substrate
6 driving apparatus
7 pointer
8, 9, 15, 16 light source
11 liquid crystal panel
12, 13 light guide plate
14 support body
17 light source substrate
21 first display plate
22 second display plate
23 space portion
24 cone portion
61 pointer shaft
71 detour portion
72 pointing portion
73 connecting portion
74 colored layer
75 tubular member
141 first holding portion
142 second holding portion
143 opening portion
211 first indicator portion
212 first background portion
213 first window portion
214 first cone portion
220 cone portion
221 second indicator portion
222 second background portion
223 second window portion
224 second cone portion
225 light guide member
226 different light guide member
241 slit
711 first pointer portion
712 second pointer portion
713 third pointer portion
D predetermined distance
FPC flexible printed circuit
P1 point
P2 tip
RC rotation center axis (virtual axis serving as rotation center)

The invention claimed is:

1. A pointer-type meter comprising:
a display;
a display plate having an indicator portion, surrounding the periphery of the display, and placed to allow visual recognition of the display, a driving apparatus placed at the back of the display and having a pointer shaft protruding toward the display, the display plate having a first display plate and a second display plate placed closer to an observer than the first display plate;
a pointer coupled to the pointer shaft and pivoting about the pointer shaft serving as a rotation center to point to the indicator portion, the pointer including a detour portion at least extending on a back-face side of the display and bent in a direction of the rotation center and a pointing portion extending in a direction opposite to the rotation center on a front side of the display plate to point to the indicator portion; and
a light guide member positioned adjacent to a light source and extending toward a back of the second display plate such that the light guide member is closer to the observer than the first display plate;
wherein:
a point of the detour portion farthest from the rotation center is closer to the rotation center than a tip of the pointing portion,
a point of the detour portion extending in the direction of the rotation center extends between the first display plate and the second display plate toward the rotation center and connects to the pointing portion, and
the pointing portion extends in a direction opposite to a rotation center axis along a front face of the second display plate.

2. The pointer-type meter according to claim 1, wherein:
the display plate has a first cone portion increased in diameter from a first deep portion toward the observer and a second cone portion increased in diameter from a second deep portion closer to the first cone portion toward the observer, and
a point of the detour portion extending in the direction of the rotation center extends between the first cone portion and the second cone portion toward the rotation center and connects to the pointing portion.

3. The pointer-type meter according to claim 1, wherein:
the display plate has a cone portion increased in diameter from a deep portion toward the observer, and
a point of the detour portion extending in the direction of the rotation center passes through an approximately intermediate portion of the cone portion toward the rotation center and connects to the pointing portion.

4. The pointer-type meter according to claim 1, further comprising:
an edge member surrounding a display area of the display along a window portion.

* * * * *